(12) United States Patent
Fletcher et al.

(10) Patent No.: US 7,010,681 B1
(45) Date of Patent: Mar. 7, 2006

(54) METHOD, SYSTEM AND APPARATUS FOR SELECTING ENCRYPTION LEVELS BASED ON POLICY PROFILING

(75) Inventors: James Corvin Fletcher, Apex, NC (US); David Louis Kaminsky, Chapel Hill, NC (US); Carl Shawn Kessler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,387

(22) Filed: Jan. 29, 1999

(51) Int. Cl.
*H04L 9/00* (2006.01)

(52) U.S. Cl. .................................. 713/154; 713/166
(58) Field of Classification Search ................ 713/151, 713/152, 154, 166
See application file for complete search history.

(56) References Cited

U.S. PATENT DOCUMENTS

| | | | |
|---|---|---|---|
| 4,881,179 A | 11/1989 | Vincent | 364/518 |
| 5,077,795 A | 12/1991 | Rourke et al. | 380/55 |
| 5,163,147 A | 11/1992 | Orita | 395/600 |
| 5,204,961 A | 4/1993 | Barlow | 395/725 |
| 5,414,844 A | 5/1995 | Wang | 395/650 |
| 5,701,342 A * | 12/1997 | Anderson et al. | 713/176 |
| 5,774,525 A | 6/1998 | Kanevsky et al. | 379/88 |
| 5,812,989 A | 9/1998 | Witt et al. | 705/45 |
| 5,828,832 A | 10/1998 | Holden et al. | 395/187.01 |
| 6,275,824 B1 * | 8/2001 | O'Flaherty et al. | 707/9 |
| 6,609,202 B1 * | 8/2003 | Chan | 713/189 |

OTHER PUBLICATIONS

The Microsoft Press Computer Dictionary 1997, Microsoft Press, $3^{rd}$ ed., p. 299.*

* cited by examiner

*Primary Examiner*—Andrew Caldwell
(74) *Attorney, Agent, or Firm*—Jerry W. Herndon; Marcia L. Doubet; Jeanine S. Ray-Yarletts

(57) ABSTRACT

The present invention depicts a method, system and program product for controlling levels of security and levels of encryption based on a predefined policy profile. This enables administrators and those who control the network to easily respond to changes in the requirements of the security levels for specific applications. It also allows for response to changes in personnel (such as someone being removed from a position that had topsecret security access) and accommodates variations in access by client devices.

15 Claims, 4 Drawing Sheets

10 <title> Annual Report</title>

20 <unclassified>
Our company had a successful year.
</unclassified>

30 <secret>
Our profits are up 15%.
</secret>

40 <topsecret>
Our domestic output increased 22% but our international output decreased 15%.
</topsecret>

10 <title> Annual Report</title>

20 <unclassified>
   Our company had a successful year.
   </unclassified>

30 <secret>
   Our profits are up 15%.
   </secret>

40 <topsecret>
   Our domestic output increased 22% but our international output decreased 15%.
   </topsecret>

Fig.1

```
<secret>
Here is some secret text
<topsecret>
but this inner part is topsecret
</topsecret>
while continuing on with secret text.
</secret>
```

Fig. 2

```
0-9        : plaintext
10 - 49    : 56-bit DES
50 - 75    : 128-bit DES
76 - 99    : 256-bit DES
```

Fig. 4

METHOD, SYSTEM AND APPARATUS FOR SELECTING ENCRYPTION LEVELS BASED ON POLICY PROFILING

BACKGROUND OF THE INVENTION

Communications networks are widely used to send and receive messages among nodes that are connected thereto. Communications networks may include, for example, wired and wireless communications networks, local area networks, the Internet, other connections based networks or any combination thereof. The nodes may include but are not limited to mainframe computers, mid-range computers, personal computers, notebook devices, hand held devices, radiotelephones, applications programs, devices such as smart cards or adapters and combinations thereof.

Crytography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

In addition to preventing unintended disclosure, cryptography also provides a, mechanism for preventing unauthorized alteration of data transmitted or stored in electronic form. After the data has been transformed cryptographically, an unauthorized person is unlikely to be able to determine how to alter the data, because the specific data portion of interest cannot be recognized. Even if the unauthorized user knew the position of the data portion within a data file or message, this position may have been changed by the transformation, preventing the unauthorized person from merely substituting data in place. If an alteration to the transformed data is made by the unauthorized user despite the foregoing difficulties, the fact of the alteration will be readily detectable, so that the data-will be considered untrustworthy and not relied upon. This detection occurs when the transformation is reversed; the encrypted date will not reverse to its original contents properly if it has been altered. The same principle prevents unauthorized addition of characters to the data, and deletion of characters from the data, once it has been transformed.

The transformation process performed on the original data is referred to as "encryption." The process of reversing the transformation, to restore the original data, is referred to as "decryption." The terms "encipher" and "decipher" are also used to describe these processes, respectively. A mechanism that can both encipher and decipher is referred to as a "cipher." Data encryption systems-are well known in the data processing art. In general, such systems operate by performing an encryption on a plaintext input block, using an encryption key, to produce a ciphertext output block. "Plaintext" refers to the fact that the data is in plain, unencrypted form. "Ciphertext" refers to the fact that the data is in enciphered or encrypted form. The receiver of an encrypted message performs a corresponding decryption operation, using a decryption key, to recover the original plaintext block.

A cipher to be used in a computer system can be implemented in hardware, in software, or in a combination of hardware and software. Hardware chips are available that implement various ciphers. Software algorithms are known in the art as well.

Historically, encryption for computer programs has been performed either based on the session over which the traffic flowed or by the application program itself determining its level of security and encrypting all of the information it sends in an end-to-end manner. This end-to-end manner of encryption requires a secure session, where hardware devices or software devices are used to encrypt everything that flows across the link and a corresponding device is required at the receiving end to decrypt everything. This means that even non-critical data is encumbered by the processing overhead of the encryption and decryption.

OBJECTS OF THE INVENTION

It is an object of the present invention to provide an easily maintainable method for selective encryption.

It is a further object of the present invention to minimize the processing requirement for information where part of the information requires high security and part of the information requires little or no security.

It is a further object of the invention to enable a programmatic means for only transferring the information that a user is authorized to view out of a larger set of information having many security authorizations.

It is a further object of the invention to enable a programmatic means for only transferring the information that can be sufficiently decrypted by a client device out of a larger set of information having many security authorizations.

SUMMARY OF THE INVENTION

These and other objects are met by the present invention. The present invention discloses a method, system and apparatus for selecting encryption levels based on policy profiling and client device capabilities. It discloses a means for determining, based on user group or profile and connection type, the level of security required for data transmission on a given session. It allows categories of groups to be assigned easily modifiable security clearance levels for information receipt. Using the present invention, the application need only identify the minimum level of encryption required (or appropriate) for the given application session or particular data fragment. Using the combination of the end user group profile and the application identified requirements, the optimal security versus network, client device and server capabilities may be obtained.

In the present invention, the network middleware described herein determines the security level. The prior art suffers from a number of drawbacks remedied by the present invention. First, security is all-or-nothing in the prior art. Encryption requirements and policies are typically decided based either on the application, in which case every packet sent by the application is encrypted end to end, or by the connection type whereby the packets are encrypted at a link level. Either of these methods typically are extreme in the sense that data may be over encrypted or under encrypted because of the limitations of processing the entire session and the required resources to accomplish this. In the present invention, encryption levels are determined and applied dynamically based on a defined policy optimizing the encryption applicability. This removes some of the administrative problems from the application concerning encryption levels. That is, in prior art, a user is given access to an electronic document or he isn't given access. Using the present invention, a user can be given access only to appropriate sections of a larger document.

Second, similarly, prior art requires that a client device support the chosen encryption mechanism to receive requested information. The present invention allows a user on a client device to receive portions of a document if the client device is capable of sufficient encryption to receive those portions, even if it is not capable of sufficient encryption to receive the entire document.

Combining the previous two points, sections within a document are filtered out if (a) the user is not authorized to see them or (b) the device is not sufficiently secure to receive them. The remaining content is encrypted using the selected encryption mechanism (where the selection process is described below, and includes configurable levels of security, as described above), and sent to the client.

Third, the prior art does not recognize roles within an organization. For example, information deemed "secret" by a lawyer might be more sensitive to a corporation than information deemed secret by an engineer. The present invention provides mechanisms for tailoring encryption based on organizational roles, and modifying these actions based on those roles without making changes to the installed middleware. Rather, changes in these actions require only changes in table entries.

Fourth, as computers become more powerful, it becomes easier to break existing encryption techniques. In the current art, replacing an application's encryption technique requires making changes to the application itself. For example, changing from use of a 56-bit encryption to use of a 64-bit encryption would require that the application be reinstalled. Using the present invention, changing which encryption technique is selected requires only changes in a database.

BRIEF DESCRIPTION OF THE DRAWINGS

FIG. 1 depicts a sample document in XML implementing the present invention.

FIG. 2 is an example of nested XML security tags.

FIG. 4 represents a sample mapping in a security database.

DETAILED DESCRIPTION OF THE PREFERRED EMBODIMENT

Figure 3:
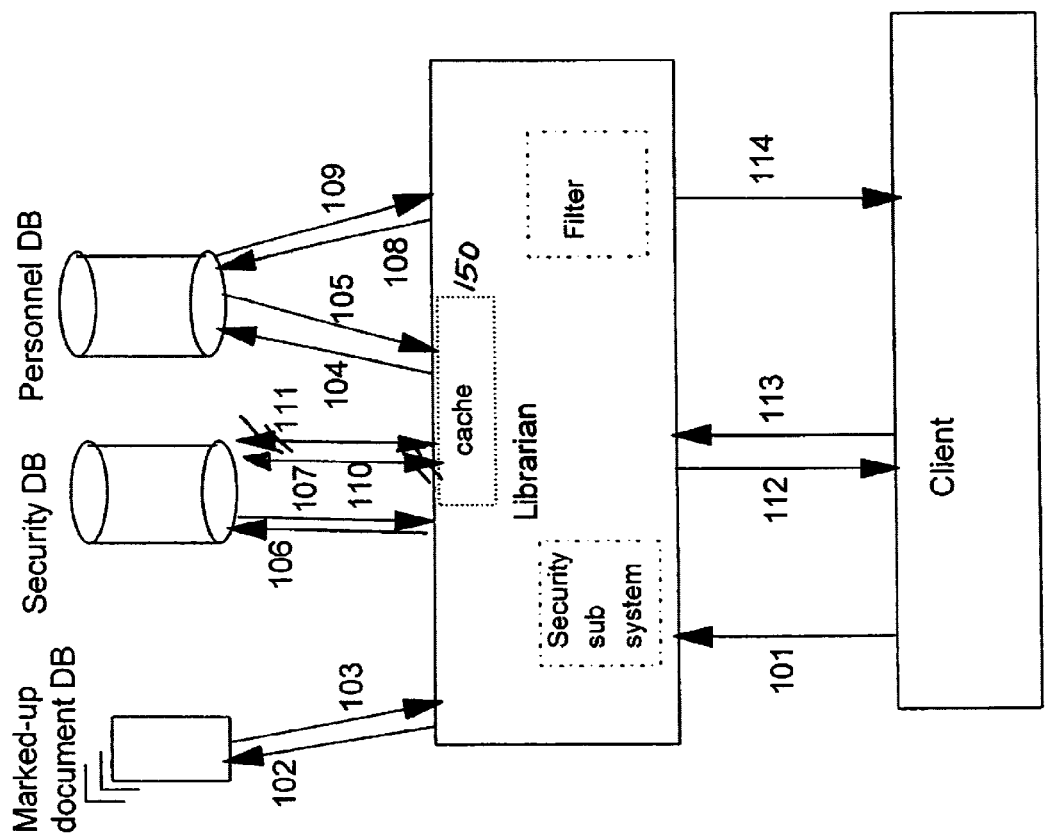
FIG. 3 depicts the interactions between the document, the security database and the database containing user definitions.

Many conceivable implementations of the present invention exist. The preferred embodiment of the present invention will be presented using XML (extensible Markup Language) tags and data stored on one or more servers. In this implementation the client sends credentials to a server, which sends authorized parts of a document to the client. For example, the document might have <TOPSECRET>. </TOPSECRET>, <SECRET> ... </SECRET>, and <PUBLIC> ... </PUBLIC>as its security level authorizations. If a user presents SECRET credentials, they can view SECRET and PUBLIC information, but the TOPSECRET information is removed.

Before the process starts, it is assumed that authors have written documents using XML to denote the security requirements of the various sections of a document, along with standard markup instructions such as section headers and italicization. For example, a document might look like that depicted in FIG. 1.

In the example of FIG. 1, the document begins with a standard tag, title (10), indicating that "Annual Report" is the title of the document. The next three sentences are marked with security indicators. The first tag indicates that the text is unclassified (20); the second that the text is secret (30); the third, that is topsecret (30).

In addition, security tags can be nested as in FIG. 2. In such cases, the innermost tag takes precedence.

It is to be noted that, as discussed below, the tags themselves do not have semantic meaning, but are instead used as keys in the security database. Therefore, the keys can be any tags not already having an alternate use. The names of the security levels are determined by a systems administration, as are the relationships among them. For example, in some installations, SECRET might be considered more secure than TOPSECRET. In any case, the actual names of the security levels are not important to the process described herein.

The process begins, as shown in FIG. 3, when a person using a client device requests a document by sending a document request to the Librarian (101). In order to clarify the terminology used below, the person requesting a document is depicted as the "user" and the device that is used to request and view that document the "client device" or simply the "client". The term "Librarian" is used to describe a collection of processes executed on the server. The request contains the name of the document, the user's name and the user's password. Security mechanisms besides userid/password can be used without materially affecting the present invention. The userid/password combination is used here as an example because of its wide public acceptance.

The librarian sends a request for the document's header to the document database (102). The librarian then receives the document header (103) from the document database. The header contains the document's author, and the security tags used in the document.

The librarian process then passes the author's name to the personnel database (104) and receives the author's role in the company as a response (105). For example, John Smith might be a lawyer, and Jane Doe an engineer. Role retrieval is a simple database lookup; that is, it is assumed that names and roles are stored in a standard corporate database.

The list of security tags and the author's role is then passed to the security database (106). The security database contains a mapping of (role, tag) tuples to absolute levels of security, represented by an integer. The security database returns this integer (107) For example,
(CEO, topsecret) might map to 99
(CEO, secret) to 80
(engineer, topsecret) to 75
(engineer, secret) to 50
(engineer, classified) to 25

The present invention is not limited to integers. Any indexable or discrete mapping is possible although integers make the most intuitive sense for sample purposes. It is assumed that the company assigns these requirements according to their business necessities. It is an important aspect of this invention that the security database can be updated dynamically to reflect changing business requirements. For example, the mapping (engineer, secret) could be updated to 55 with no effect on any other component of the system. This flexibility is useful.

Next, the librarian looks up the requester in the personnel database (108) using the user's ID and password to determine the maximum level of security that the requester is authorized to access. The librarian receives this information (109). If the requester's authorization level is below the lowest level indicated in the document, the user is informed that he may not access any part of the document, and the process is terminated. If the requester is authorized to view at least part of the document, his authorization level is cached by the librarian for later use.

The figure shows a generic cache (150) in the librarian. To speed performance, the cache can store document headers, personnel information and security information, replacing entries using a Least Recently Used policy. The method of the present invention will work correctly even without a cache although it may perform more slowly.

Note that it has been specified that a simple integer shall be used to indicate absolute security level. One skilled in the art will recognize that more sophisticated mechanisms can be used. For example, for compartmentalized information, the single integer can be converted to a (compartment, security level) tuple, and authorization is granted on a compartment-by-compartment basis.

Next, the security database maps the integers to available security protocols 110, 111. For example, the security database might contain the information as presented in FIG. 4.

Thus, security level 25 would require 56-bit DES. Again, it is assumed that a systems administrator for a company would adjust these levels based on their own perceived security requirements, and the available encryption technologies.

In addition, a systems administrator for a company can specify multiple alternative encryption technologies for the same security level. This feature is useful in dealing with heterogeneous client devices. For example, one type of personal digital assistant (PDA) might support one type of encryption while another type of PDA might only support a different, but equally secure, technology.

It is another important aspect of this invention that the systems administrator for a company can adjust the type of encryption used simply by changing an entry in a database. For example, if 128-bit DES become less expensive to crack, the company can require (e.g.) 256-bit DES for scores above 85. This greatly reduces the administration required for secure transmission. This is in contrast to an application in which security is built-in. In such cases, changing the level of security requires that the application itself be updated. Software update is known throughout the industry to be expensive.

This above discussion of security protocols should not be construed to limit this invention to using the specified protocols. The present invention is equally applicable to all security protocols.

Referring to FIG. 3, at this point, the librarian has determined the algorithm(s) required to transmit the information in the requested document. Next, it must determine whether the client device supports any of the algorithms. The librarian transmits an indication of the required encryption protocols to the client (112). The client then responds with the protocols that it supports (113). The librarian now has all of the information required to transmit the document to the requester.

The next step is to filter out the portions of the document that the requester is not permitted to see. The librarian uses the document name to fetch the entire document from the document database. (Recall that only the header was fetched earlier.)

The librarian's filtering process then removes the parts of the document that the requester cannot see. It parses each tag in the text and again uses the author's role to determine the absolute security level of the section governed by the tag. If the user is not authorized to see this level of information, the section is removed from this temporary copy of the document. It should be noted that all filtering is done on the temporary copy of the document. The original document is left unaltered in the document database for later use.

Next, the client device's security capability is used to further filter the document. For example, if the section requires security of 85, and the CEO is requesting the document, then that section would typically be included. However, if the CEQ was using a device that only supported encryption valid up to level 75, that section would be removed since the client device does not support a sufficiently strong cipher. In a variation of the preferred embodiment of the present invention, the system could be configured to allow certain individuals such as a CEO to override the client device requirements.

The librarian next selects the security algorithm. The librarian selects the least secure algorithm that meets the security requirement of the most secure portion of the filtered; document. (As strong ciphers typically require more processing, and thus are slower, it saves processor time to select the least secure algorithm.) For example, consider a case where a document has sections that map to security levels 10, 30, 50, 70 and 90; the requester can see up to level 80; and the client supports three encryption algorithms A, B, and C. Further assume that algorithm A is considered secure up to level 20; B up to level 55; C to level 65; some algorithm D to level 80 and another algorithm E to 99. (D and E are not supported by the client.) Since the requester is only authorized up to level 80, the section of the document requiring level 90 will be filtered out. Further, since the client device does not support either encryption protocols D or E, the document section requiring level 70 will also be filtered out. So, since the remaining document has maximum security level of 50, protocol B will be chosen, since it is the lightest weight protocol that supports the maximum requirement (50). Other selection criteria for security algorithms can be used without materially affecting the present invention. For example, some installations might choose to always use the strongest possible encryption.

The librarian process then encrypts the filtered document using that algorithm, and delivers it to the client (114). Note that the order of certain steps in this process can be interchanged without affecting the novelty of the present invention. For example, the librarian could perform all database lookups at the beginning of the process, rather than waiting until such lookups are necessary.

It should also be noted that while static documents are implicitly assumed, the present invention applies also to dynamic content. Often web documents are constructed by web servers only when they are requested. The web server stores a collection of sub-documents, which are assembled into documents when a web request is satisfied. One skilled in the art will immediately recognize that the web sub-documents are analogous to the sections (or collections of sections) described above, and will recognize the applicability of the present invention to such cases.

What is claimed is:

1. A method of using structured documents to specify selective encryption requirements for document content to be transmitted from a server to a client, comprising steps of:

identifying one or more security-sensitive document content sections in each of a plurality of structured documents encoded in a markup language by delimiting each of the security-sensitive sections in each of the structured documents using markup language tag syntax, wherein the markup language tag syntax is encoded in the markup language and indicates a security level of the delimited security-sensitive section;

receiving, at the server from a requester located at the client, a request for a particular one of the structured documents;

determining a maximum security level for which the requester is authorized;

filtering out, from the requested document, all of the identified security-sensitive sections for which the indicated security level is higher than the determined maximum security level for which the requester is authorized, thereby creating a filtered document; and if the filtered document is not empty, performing the steps of:

determining a most-restrictive one of the security levels indicated by the markup language tag syntax delimiting any security-sensitive sections that remain in the filtered document;

identifying, from one or more ciphers that are available to the server for encryption, any ciphers which are capable of providing the determined most-restrictive security level; and if any ciphers were identified, encrypting the filtered document using one of the identified ciphers and transmitting the encrypted filtered document to the requester at the client.

2. The method as claimed in claim 1, wherein the filtering out step further comprises the step of filtering out, from the filtered document, all of the identified security-sensitive sections for which the indicated security level is higher than the security level of all ciphers available for decryption at the client.

3. The method as claimed in claim 1, wherein an author who created the requested document is identified in a header associated with the requested document, and wherein the filtering out step further comprises the steps of:

determining a role of the identified author;

consulting a mapping that correlates the determined role to an interpretation of the security levels indicated by the markup language tag syntax in the requested document; and using the interpretation from the mapping when determining whether the indited security levels are higher than the determined maximum security level for which the requester is authorized.

4. The method as claimed in claim 3, further comprising the step of changing the interpretation of the security levels by changing the correlation it the mapping.

5. The method as claimed in claim 3, wherein the identification of the author indicates a user group of which the author is a member, and the determined role is the role of the user group.

6. The method as claimed in claim 1, wherein the security level provided by the cipher used to encrypt the filtered document is a least secure one of the security levels provided by the identified ciphers.

7. The method according to claim 1, wherein the step of determining the main security level for which the requester is authorized further comprises the step of using an identifier and password of the requester to access a repository wherein requesters and their maximum authorized security levels are identified.

8. The method according to claim 7, wherein the identifier and password of the requester are communicated with the request for the structured document.

9. The method as claimed in claim 1, wherein the step of identifying any ciphers further comprises the step of consulting a repository where a mapping between ciphers and the security level provided by those ciphers is stored.

10. The method as claimed in claim 9, further comprising the step of changing the security level which a particular cipher is capable of providing by changing the security level in the mapping for the particular cipher.

11. The method as claimed in claim 1, wherein the cipher used for encrypting the filtered document is selected from the identified ciphers by selecting that one of the identified ciphers which is available for decryption on the client and which provides a least secure one of the security levels provided by the identified ciphers.

12. The method as claimed in claim 1, wherein the requested structured document is dynamically composed from a plurality of subdocuments, at least one of which has at least one security-sensitive section and others of which may have zero or more security-sensitive sections.

13. The method as claimed in claim 1, wherein the markup language in which the requested structured document is encoded is the Extensible Markup Language ("XML").

14. A system for using structured documents to specify selective encryption requirements for document content to be transmitted from a server to a client, comprising:

a plurality of structured documents encoded in a markup language, each of the structured documents identifying one or more security-sensitive document content sections therein by delimiting each of the security-sensitive sections using markup language tag syntax, wherein the markup language tag syntax is encoded in the markup language and indicates a security level of the delimited security-sensitive section;

means for receiving, at the server from a requester located at the client, a request for a particular one of the structured documents;

means for determining a maximum security level for which the requester is authorized;

means for filtering out, from the requested document, all of the identified security-sensitive sections for which the indicated security level is higher than the determined maximum security level for which the requester is authorized, thereby creating a filtered document; and means for, if the filtered document is not empty, (1) determining a most-restrictive one of the security levels indicated by the markup language tag be syntax delimiting any security-sensitive sections that remain in the filtered document; (2) identifying, from one or more ciphers that are available to the server for encryption, any ciphers which are capable of providing the determined most-restrictive security level; and (3) if any ciphers were identified, encrypting the filtered document using one of the identified ciphers.

15. A computer program for us structured documents to specify selective encryption requirements for document content to be transmitted from a server to a client, the computer program product residing on programmable media and comprising:

computer executable program code means for receiving, at the serer from a requester located at the client, a request for a structured document;

computer executable program code means for locating the requested structured document among a plurality of structured documents encoded in a markup language, each of the structured documents identifying one or more security-sensitive document content sections therein by delimiting each of the security-sensitive sections using markup language tag syntax, wherein the markup language tag syntax is encoded in the markup language and indicates a security level of the delimited security-sensitive section;

computer executable program code means for determining a maximum security level for which the requester is authorized;

computer executable program code means for filtering out, from the located document, all of the identified security-sensitive sections for which the indicated security level is higher than the determined maximum security level for which the requester is authorized, thereby creating a filtered document; and computer executable program code means for, if the filtered document is not empty, (1) determining a most-restrictive one of the security levels indicated by the markup language tag syntax delimiting any security-sensitive sections that remain in the filtered document; (2) identifying, from one or more ciphers that are available to the server for encryption, any ciphers which are capable of providing the determined most-restrictive security level; and (3) if any ciphers were identified, encrypting the filtered document using one of the identified ciphers and transmitting the encrypted filtered document to the requester at the client.

* * * * *

UNITED STATES PATENT AND TRADEMARK OFFICE
CERTIFICATE OF CORRECTION

PATENT NO. : 7,010,681 B1
APPLICATION NO. : 09/240387
DATED : March 7, 2006
INVENTOR(S) : Fletcher et al.

Page 1 of 1

It is certified that error appears in the above-identified patent and that said Letters Patent is hereby corrected as shown below:

Column 6,
Line 3, change "CEQ" to -- CEO --;

Column 7,
Line 35, change "indited" to -- indicated --;
Line 50, change "main security" to -- maximum security --;

Column 8,
Line 36, change "tag be syntax" to -- tag syntax --;
Line 44, change "for us" to -- for using --;
Line 50, change "the serer" to -- the server --.

Signed and Sealed this

Fourteenth Day of November, 2006

JON W. DUDAS
*Director of the United States Patent and Trademark Office*